Dec. 10, 1929.　　　F. W. KELLY ET AL　　　1,738,834
PASTEURIZING APPARATUS
Filed March 21, 1927　　　5 Sheets-Sheet 1
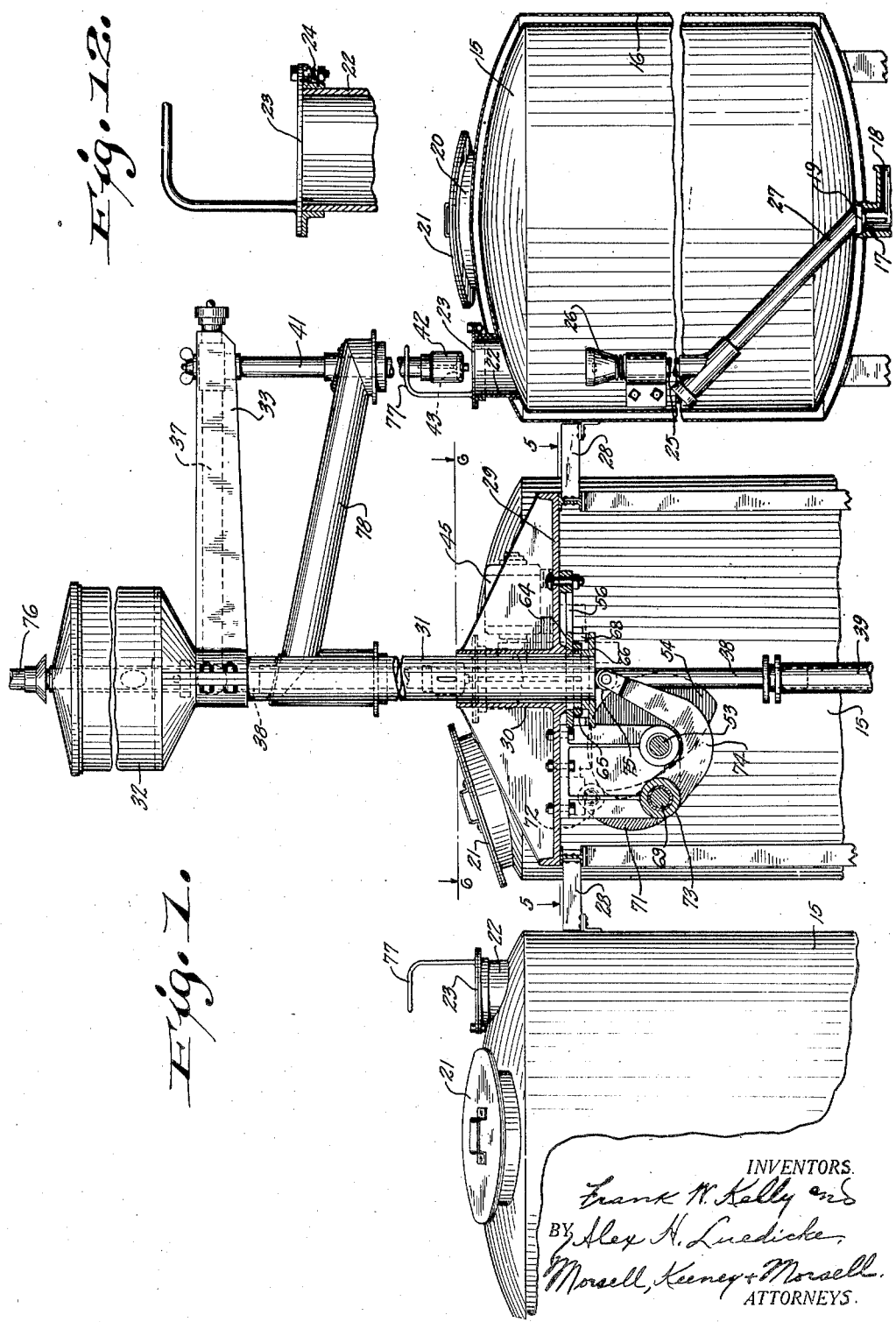
INVENTORS.
Frank W. Kelly and
BY Alex H. Luedicke.
Morsell, Keeney & Morsell.
ATTORNEYS.

Dec. 10, 1929.   F. W. KELLY ET AL   1,738,834
PASTEURIZING APPARATUS
Filed March 21, 1927   5 Sheets-Sheet 2
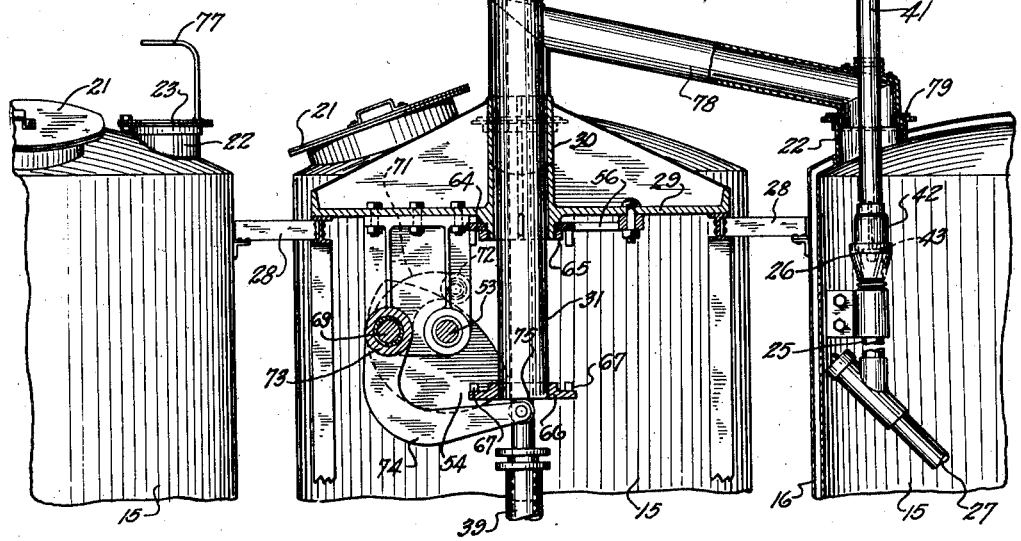
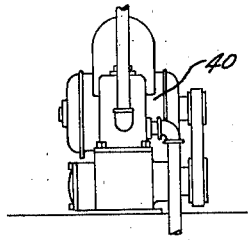
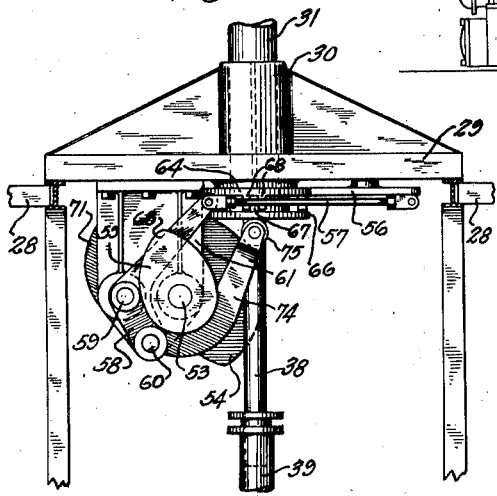
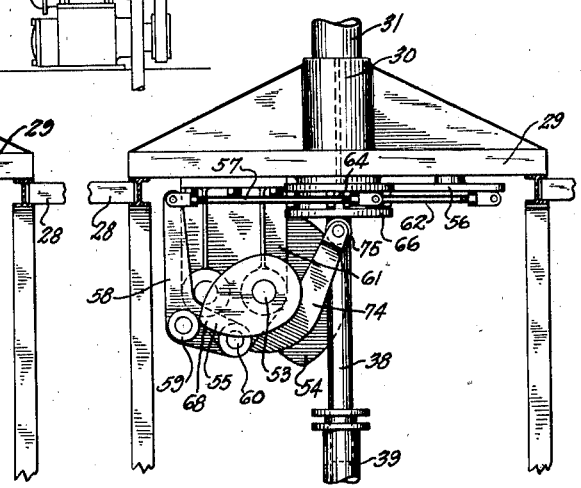
INVENTORS.
Frank W. Kelly and
BY Alex H. Luedicke.
Morsell, Keeney + Morsell.
ATTORNEYS.

Dec. 10, 1929.  F. W. KELLY ET AL  1,738,834
PASTEURIZING APPARATUS
Filed March 21, 1927  5 Sheets-Sheet 3

INVENTORS.
Frank W. Kelly and
BY Alex H. Luedicke
Morsell, Keeney & Morsell.
ATTORNEYS.

Dec. 10, 1929.  F. W. KELLY ET AL  1,738,834
PASTEURIZING APPARATUS
Filed March 21, 1927  5 Sheets-Sheet 4
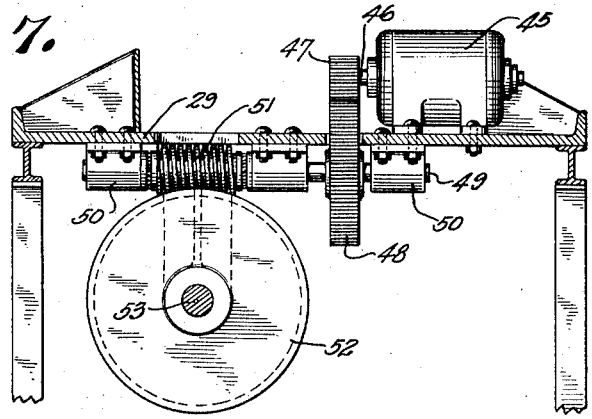
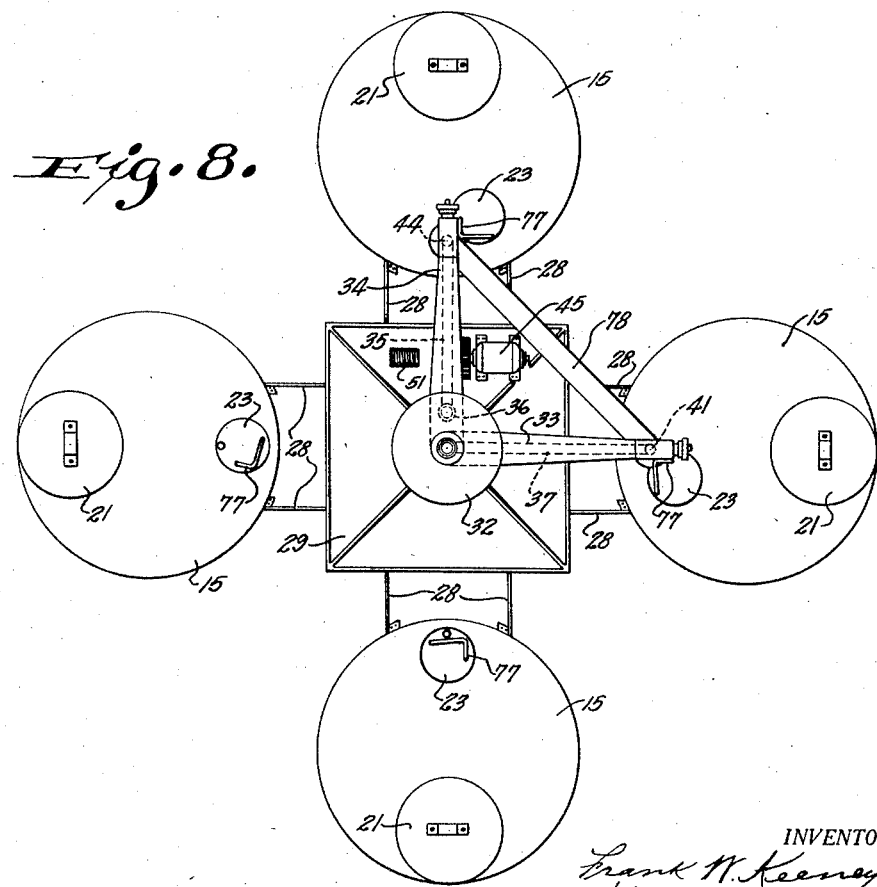
INVENTORS.

Dec. 10, 1929.  F. W. KELLY ET AL  1,738,834
PASTEURIZING APPARATUS
Filed March 21, 1927    5 Sheets-Sheet 5

INVENTORS.
Frank W. Kelly and
BY Alex H. Luedicke.
Morsell, Keeney & Morsell,
ATTORNEYS Patented Dec. 10, 1929

1,738,834

UNITED STATES PATENT OFFICE

FRANK W. KELLY AND ALEX H. LUEDICKE, OF MILWAUKEE, WISCONSIN, ASSIGNORS TO GRIDLEY DAIRY CO., OF MILWAUKEE, WISCONSIN, A CORPORATION OF WISCONSIN

PASTEURIZING APPARATUS

Application filed March 21, 1927. Serial No. 177,166.

This invention relates to improvements in pasteurizing apparatus, particularly adapted for milk, cream and other liquids.

Heretofore, each holding tank or chamber in a pasteurizing apparatus has been constructed with an inlet valve and an outlet valve, both of which connected directly with the pipe lines of the system. This arrangement is objectionable for the reason that the valves will leak and allow a leakage of the liquid in the tank to pass into the system before absolute pasteurization has taken place.

It is, therefore, the primary object of the present invention to provide a pasteurizing apparatus in which the tanks or chambers do not have valves, preventing any leakage of liquid from the tank during pasteurization, and so arranged that the liquid cannot be withdrawn from a holding tank until a predetermined interval has elasped sufficient to insure absolute pasteurization of the entire contents of the tank.

A further object of the invention is to provide a pasteurizing apparatus which is very adaptable in that the holding tanks used therewith may be of any number and of any suitable shape and size.

A further object of the invention is to provide a pasteurizing apparatus in which the tanks may be self-contained units, or large compartment tanks.

A further object of the invention is to provide a pasteurizing apparatus in which each individual tank or chamber may be equipped with a temperature control.

A further object of the invention is to provide a pasteurizing apparatus in which the tanks have no inlet or outlet valves or connections through their shells thus preventing the possibility of leakage between the inlet and outlet lines, preventing the possibility of any portion of the liquid in the container from changing its temperature from a predetermined temperature, and further preventing the possibility of leakage in the milk lines of the apparatus which might require washing and sterilization.

A further object of the invention is to provide a pasteurizing apparatus in which the connections for filling and emptying the tanks are made at points inside of each tank, thereby maintaining the desired temperature.

A further object of the invention is to provide a pasteurizing apparatus in which it is absolutely impossible for the operator to discharge any of the milk from any tank before the milk has been properly treated.

A further object of the invention is to provide a pasteurizing apparatus in which the tanks, except for the insulated man-hole, are completely jacketed, permitting the application of heat to the entire inner surface, thereby preventing the accumulation of condensation and the consequent drop in temperature and possible contamination of the tank contents.

A further object of the invention is to provide a pasteurizing apparatus in which the filling of the tanks is performed under conditions which will reduce the foam created, but will effectively pasteurize any foam created.

A further object of the invention is to provide a pasteurizing apparatus which is of simple construction, is efficient in operation, is strong and durable, and is well adapted for the purposes described.

With the above and other objects in view, the invention consists of the improved pasteurizing apparatus, and its parts and combinations as set forth in the claims, and all equivalents thereof.

In the accompanying drawings in which the same reference characters indicate the same parts in all of the views:

Fig. 1 is a side view of the improved pasteurizing apparatus, parts being shown in vertical section, as indicated on the line 1—1 of Fig. 5, and the tank filling and emptying means being shown in raised position;

Fig. 2 is a fragmentary view, similar to Fig. 1, with the tank filling and emptying means being shown in lowered position;

Fig. 3 is a detail view taken on line 3—3 of Fig. 5, and showing the mechanism for intermittently turning the filling and emptying means in one position;

Fig. 4 is a similar view showing the turning mechanism in another position;

Fig. 7 is a detail sectional view taken on line 7—7 of Fig. 5;

Fig. 8 is a plan view of the apparatus and on a smaller scale;

Fig. 12 is an enlarged detail view of a tank neck and the cover therefor.

Figure 5:
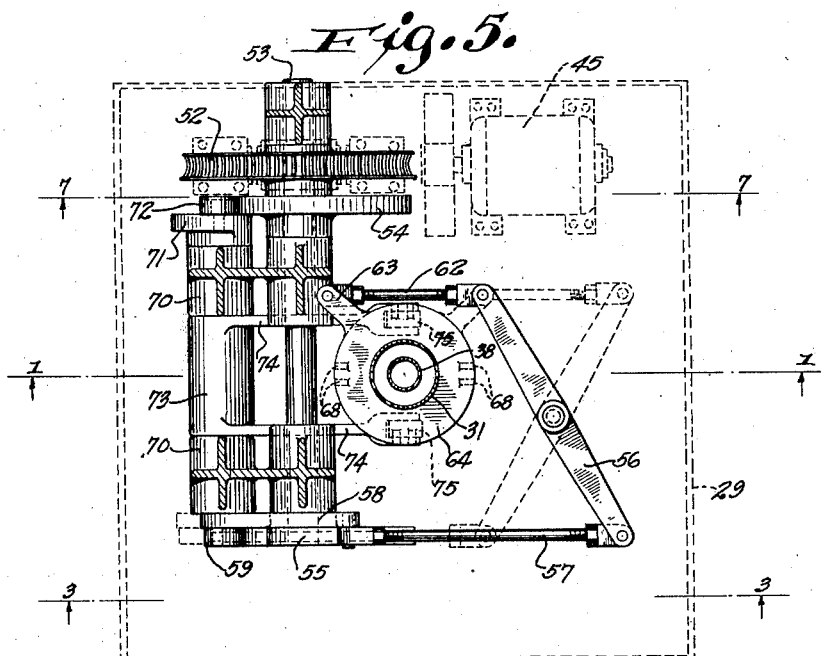
Fig. 5 is a horizontal sectional view taken on line 5—5 of Fig. 1, showing the mechanism for operating the apparatus.
Figure 6:
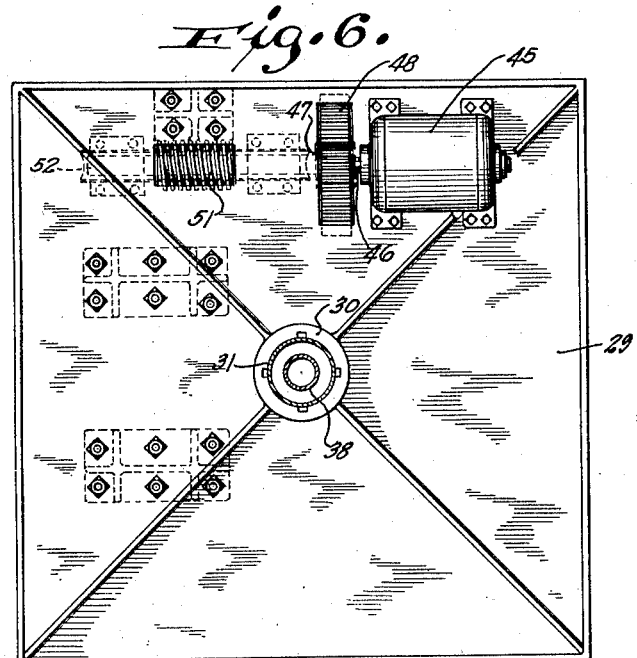
Fig. 6 is a horizontal sectional view taken on line 6—6 of Fig. 1.

Referring now more particularly to the drawings, it will appear that the numeral 15 indicates a stationary pasteurizing holding tank or chamber of a large capacity, and in the improved pasteurizing apparatus any desired number of said tanks or chambers may be used. However, in the apparatus shown in the drawings, four tanks are used, separated by ninety degree intervals.

As shown in Fig. 1, the surface of each tank or chamber is covered by a jacket 16, permitting the application of heat to the inner surface of the tank to prevent the accumulation of condensation and the consequent drop in temperature and possible contamination of the tank contents. The bottom of each tank is provided with a central opening 17 from which a short connection 18 extends, said opening being utilized in draining liquid from the tank when the same is cleaned and the opening normally being closed by a valve 19. The top portion of each tank is also provided with a man-hole 20 closed by a suitable lid 21. The top of each tank, adjacent the inner edge portion, is further provided with an open neck 22 providing inlet and outlet communication with the interior of the tank, and the open end of the neck is controlled by a pivotally mounted cover 23 adapted to be swung to open position against the tension of a spring 24 which will automatically return it to closed position when pressure against the cover is released. A short vertical pipe 25 is secured within each tank below the neck 22, and the upper end portion of each pipe is provided with a yieldably mounted coupling 26. Each vertical pipe 25 communicates with a downwardly and inwardly inclined pipe 27, the lower end of which is open.

The side portion of each tank carries a pair of inwardly extending braces or supports 28 on which a central horizontal plate 29 is secured, said plate being formed with a central tubular bearing portion 30. An elongated tubular vertical pillar 31 extends through the bearing portion 30 of the plate and the upper end portion of said pillar has mounted thereon a supply tank 32 of a large capacity. The upper portion of the pillar, immediately below the supply tank has secured thereto the inner end portions of a pair of laterally projecting tubular arms 33 and 34. Said arms are right angularly disposed with respect to each other and the forward arm 33 in Fig. 8 is a holding-tank-emptying arm, while the other arm 34 is a holding-tank-filling arm.

The holding-tank-filling arm 34 has an interior pipe 35, the inner end portion of which connects with an outlet pipe 36 depending from the lower portion of the supply tank (see Fig. 8), while the holding tank emptying arm 33 carries an interior pipe 37 which connects at its inner end portion with the upper end portion of a vertical outlet pipe 38 which extends through the central pillar 31. The outlet pipe 38 extends at its lower end portion into a pipe 39 of a larger diameter and has a slip joint connection therewith. Said pipe 39 extends to a pump 40 of conventional form.

The forward end portion of the holding-tank-emptying arm 33 carries a depending tubular member 41 connected at its upper end with the interior pipe 37 and the lower end portion of said member 41 is provided with a connection fitting 42 in which a valve 43 is mounted, and in the position shown in Fig. 2, said connection fitting 42 is adapted to enter a coupling 26 in a tank and the valve 43 is opened. A similar depending tubular member 44 is carried by the holding tank filling arm 34, said member connecting with the interior pipe 35 and its lower end being provided with a valved fitting to make connection with a tank coupling 26, similar to that described and shown in connection with the member 41.

An electric motor 45, equipped with a timed breaking mechanism, is mounted on the upper portion of the plate 29, and the drive shaft 46 of said motor carries a gear 47 adapted to drive a larger gear 48 secured on a shaft 49 journaled in bearings 50 below the plate 29. An intermediate portion of the shaft 49 has keyed thereon a worm 51 which engages a worm wheel 52 mounted on a shaft 53 at right angles to the shaft 49.

A raising and lowering cam 54 is mounted on one end portion of the shaft 53, while a disc turning cam 55 is mounted on the other end portion of said shaft. A lever 56 is pivotally secured, medially of its ends to the underside of the plate 29 and one end portion is pivotally connected with a link 57 which in turn is pivotally connected with a bell-crank lever or arm 58. Said arm 58 is provided medially of its ends with a roller adapted to ride on the edge of the cam 55. The other end portion of the arm 58 is pivotally secured, as at 60, to a depending frame portion 61. The other end portion of the pivotally mounted lever 56 is pivotally secured to one end portion of a link or rod 62 which is pivotally secured at its other end portion to a lug 63 extending outwardly from a disc 64 which is revolubly mounted about the bearing portion 30 of the plate 29 and is retained thereon by a threaded collar 65. The lower end portion of the pillar 31 has secured thereabout a complementary disc 66 which is formed with a pair of opposed upstanding teeth 67 and upon a certain movement of the pillar, the disc 66 will engage the disc 64 with the teeth 67 between pairs of depending teeth 68 on the disc 64.

It is intended that the mechanism just described operate to intermittently turn the pillar 31 and everything carried thereby, a quarter of a revolution. The turning is accomplished when the discs 64 and 66 are in engagement, as shown in Figs. 1, 3 and 4, and at the commencement of the turning movement, the parts will be in the position shown in Fig. 3. The cam 55 is turned by means of the drives and connections with the motor 45, previously described, and is adapted to turn in a counter-clockwise direction, in Figs. 3 and 4. During the turning movement, the roller 59 of the arm 58 will ride on the eccentric portion of the cam to the apex 68 whereby the arm will be pivoted to the left in Fig. 3, pulling the link 57 therewith and pivoting the lever 56 from the full line position in Fig. 5 to the dotted line position. This will result in a movement of the disc 64 a quarter of a revolution in a clockwise direction, and a corresponding movement of the disc 66, pillar 31 and parts carried thereby, the disc 66 being engaged by the disc 64. As soon as the roller 59 reaches the apex of the cam edge, the disc 66 and pillar will commence to drop from the disc 64, by means later to be explained, and the roller will ride on the other eccentric edge of the cam 55, returning the turning mechanism to the normal full line position shown in Fig. 5. By the time said parts are returned to normal position, the parts previously mentioned will have completely dropped and the movement of the arm roller over the circular portion of the cam 55 will not change the relative positions of any of the parts of the turning mechanism.

The other cam 54 mounted on the shaft 53 controls the raising and lowering mechanism before referred to. A shaft 69 is revolubly mounted in bearing brackets 70 depending from the plate 29, and the end portion of said shaft adjacent the cam 54 has secured thereto a lever 71 having revolubly mounted at its free end a roller 72 adapted to ride on the edge of the cam 54. Movement of said lever by the cam turns the shaft 69, on the medial portion of which is keyed a hub 73 from which a pair of spaced upwardly projecting arms 74 extend, the outer ends of said arms carrying rollers 75 to engage the under surface of the disc 66.

The cam 54 turns in a counter-clockwise direction, and when the arm 71 rides on the circular edge of the cam 54, as shown in Fig. 1, there is a period of idling with no resulting up or down movement of the pillar and connected parts, and during this period of inactivity, the parts are in raised position, and the turning mechanism is operating to turn the pillar and connected parts a quarter of a revolution. However, as soon as the arm reaches the end of the circular surface of the cam, it will move onto the eccentric surface of the cam and during the first part of the movement thereon, the arms 74 will be pivoted downwardly, lowering the pillar and accompanying parts. At the end of the down movement, the parts being in the position shown in Fig. 2, the motor will be stopped by an automatic switch. After the parts have stayed in this position for a predetermined period, the motor will again be started, again turning the cam 54 in the same direction, and during the remainder of the movement of the arm 71 on the eccentric portion of the cam, the arms 74 will be raised, thereby lifting the pillar, after which there is another period of idling.

The turning mechanism and the raising and lowering mechanism have been described in detail and now the general operation of the apparatus will be briefly reviewed. The milk to be pasterized is fed from a source of supply by means of a connection 76 into the supply tank 32. The pillar 31 and tank 32 and arms 33 and 34 will be turned by the mechanism described, and then lowered so that the depending tubular members 41 and 44 will be lowered into a pair of adjacent tanks or chambers through the neck portions thereof and register with the tank pipes 25, whereupon the valves at the lower ends of the members 41 and 44 will be opened. Milk will then gravitate from the tank 32 through the filling arm 34 and into the tank entered thereby. At the same time, by means of the pump 40, pasteurized milk will be withdrawn from the other engaged tank through the emptying arm, the central pipe 38, and lower pipe 39 to a suitable container, it being remembered that the milk is held in each holding tank a desired period and subjected to a predetermined temperature while therein to thoroughly pasteurize it. The mechanism is so timed and arranged that the parts will stay in the lowered tank engaging position sufficiently long for one tank to be filled and the other emptied. Then, the mechanism will raise the pillar and arms, and turn it a quarter of a revolution in a clockwise direction, with reference to Fig. 8 of the drawings, whereupon the arms will again be lowered so that the next successive tank will be engaged by the emptying arm and the tank last emptied will be filled by the filling arm. The cycle of operation continues in this manner, as long as the mechanism is kept in operation, and it will be evident that as there is no direct connection between the holding tanks and the inlet and outlet lines, there can be no leakage of milk not thoroughly pasteurized, into either of said lines.

It should be observed that the covers 23 normally closing the necks of each tank or chamber are provided with upstanding angular members 77 adapted to be engaged by the depending members 41 and 44 when the same are brought into position over a tank neck, and the covers will be pivoted thereby to an open position, as shown. When the members 41 and 44 swing away from the tanks, they will pass by said angular members 77 and then the cover springs 24 will return the covers to closing positions.

Figure 9:
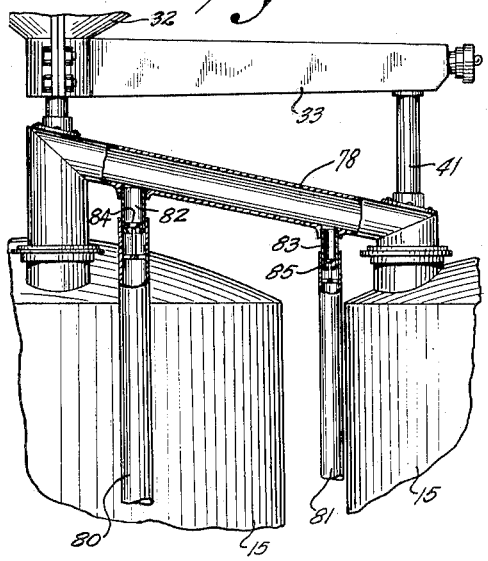
Fig. 9 is a detail view, partly in section, showing a means for heating and draining the connections between the tanks.

The invention also contemplates the introduction of heated air into the tank which is being emptied in order to keep the upper surface thereof, as well as any foam present, up to the required temperature, and to that end the depending members of the filling and emptying arms 33 and 34 are connected by a pipe 78 mounted at its end portions about said depending members 41 and 44 and inclined downwardly from the emptying arm to the filling arm so that any condensation forming in the pipe will drain toward the filling tank, the end portions of said pipe 78 being adapted to snugly enter the tank necks and being provided with a gasket or water seal 79, as clearly shown in Fig. 2. The result of this arrangement is that warm air in the tank being filled, being displaced by the milk, flows through said pipe 78 into the tank being emptied. Said pipe 78 may be either covered with insulation or jacketed, and as shown in Fig. 9, if desirable, steam and drain lines 80 and 81, may be properly positioned with respect to pairs of tanks, so that when the arms are in lowered position, projecting nipples 82 and 83 will engage said lines 80 and 81, respectively, opening valves 84 and 85, whereby the line 80 will introduce steam into the pipe 78 and the line 81 will drain off water of condensation.

Figure 10:
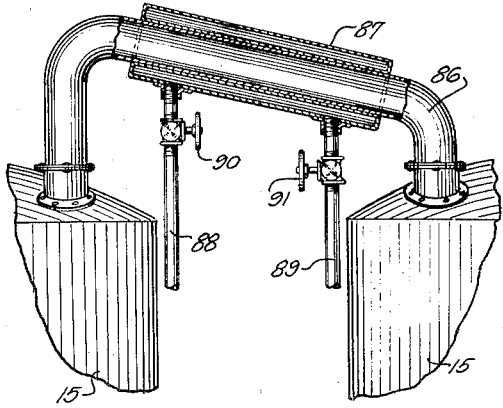
Fig. 10 is a fragmentary view, partly in section, showing as a modification a jacketed connection between a pair of tanks.
Figure 11:
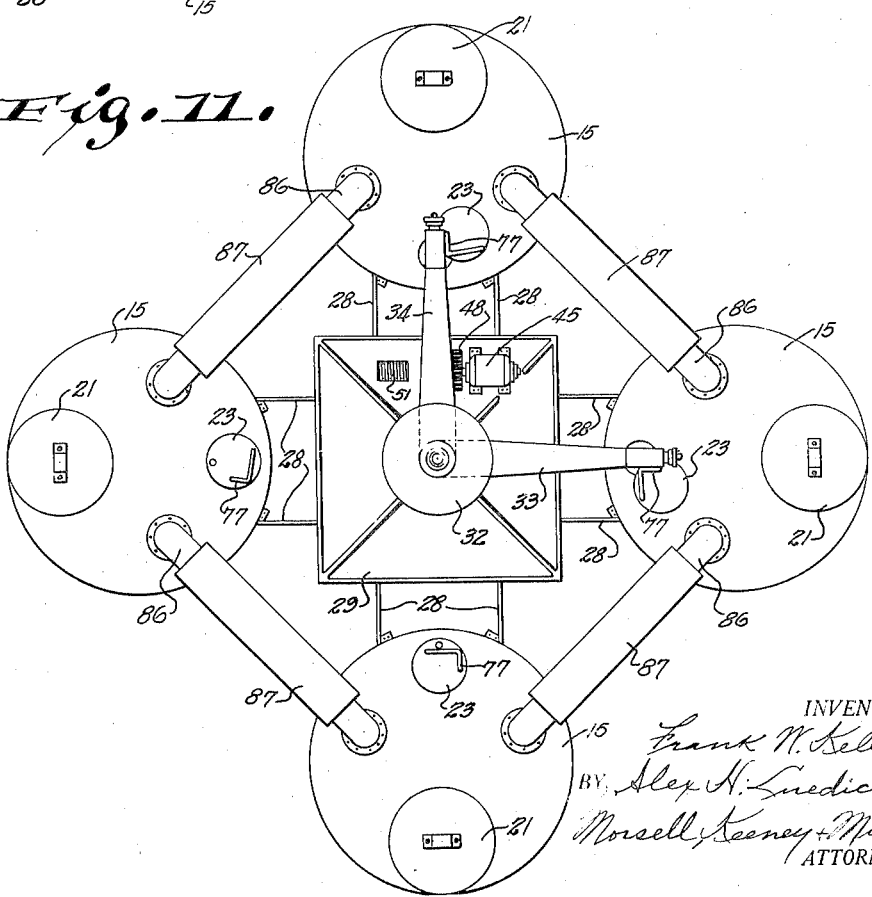
Fig. 11 is a plan view of the apparatus with the tank connections jacketed.

Another alternative method of keeping the surface of milk and the foam up to the required temperature in the tanks is shown in Figs. 10 and 11. In this form, all of the tanks 15 are directly connected by pairs of pipes 86 surrounded by jackets 87, each jacket being connected with a steam line 88 and a drain line 89, controlled by valves 90 and 91. Each pipe 86 is inclined downwardly from an emptying tank toward a filling tank, and warm air from the tank being filled is conducted to the tank being emptied. The air thus conducted is kept warm by the steam heated jackets.

From the foregoing description, it will be seen that the improved pasteurizing apparatus is of simple and novel construction, and is well adapted for the purposes described.

What we claim as our invention is:

1. In a pasteurizing apparatus, an elongated tubular central member, means for intermittently turning said central member, means for moving said central member vertically between intermittent turning movements, a supply chamber mounted at the upper end portion of said central member, a discharge pipe extending through said central member, a plurality of stationary holding chambers grouped about said central member, a tubular valve controlled chamber filling arm carried by said central member and connected with said supply chamber, and a tubular valve controlled chamber emptying arm also carried by said central member and in connection with said discharge pipe and disposed at an angle with respect to the filling arm, said arms when in a lowered position making an interior operative connection with a pair of adjacent chambers.

2. In a pasteurizing apparatus, a stationary holding tank having an internal coupling member a considerable distance below the top of the tank, a tubular fluid arm, and means for moving said arm into and out of said tank and into and out of engagement with said coupling member.

3. In a pasteurizing apparatus, a plurality of insulated holding tanks, a tank emptying member, a tank filling member, said members being jointly operable, means for intermittently revolving said members with respect to the tanks, means for lowering and raising said members into and out of a pair of tanks between intermittent revoluble movements, and a warm air supply pipe connected with said tank emptying member and adapted to connect with a tank engaged by the tank emptying arm to supply warm air to the interior thereof.

4. In a pasteurizing apparatus, a plurality of liquid holding tanks, mechanically operated tubular arms successively movable into and out of pairs of said tanks for filling one of a pair of tanks and emptying the other tank, and means for transferring hot air from the tank being filled to the tank being emptied.

In testimony whereof, we affix our signatures.

FRANK W. KELLY.
ALEX H. LUEDICKE.